United States Patent Office 3,403,855
Patented Oct. 1, 1968

3,403,855
AUTOMATIC REGULATORS OF AIR CONDITIONING SYSTEMS OF VEHICLES
Pierre Bouthors and Pierre Ventre, Billancourt, France, assignors to Regie Nationale des Usines Renault, Billancourt, France
Filed June 9, 1967, Ser. No. 644,970
Claims priority, application France, July 16, 1966, 69,655
2 Claims. (Cl. 237—8)

ABSTRACT OF THE DISCLOSURE

Device for automatically regulating the air-conditioning system of an automotive vehicle, adapted to maintain constant air output rate and temperature values within the passengers' compartment of the vehicle, irrespective of the road speed of the vehicle and the external temperature, characterised in that it comprises, for regulating the air flow rate, a tachometric generator having inserted in its output circuit a rheostat for presetting the desired value of the air output rate and an electromagnet having a sliding core adapted to control the shutter controlling the ingress of air into the compartment, and the rheostat of an electric circuit controlling the motor fans, and, for regulating the heater, a radiator adapted to be regulated by means of a by-pass inserted in a secondary circuit connected to the water-pump circuit of the vehicle, said bypass being operatively connected to an electromagnetic valve of which the energization is responsive to the output of the alternator of the vehicle, a manually operated valve controlling in the desired proportions the heating circuit being operatively connected to a rheostat inserted in the electric circuit comprising said alternator, said bypass electromagnetic valve and thermistors responsive to the room temperature of said passengers' compartment and to the external temperature, respectively.

---

The present invention relates to means for automatically regulating the air-conditioning systems of automotive vehicles.

Various means have already been proposed for maintaining the temperature of the air blown into the passengers' compartment of a vehicle at a value such that the atmosphere therein constantly remains at a predetermined temperature level. As a rule, these means make no allowance for the output of the air penetrating into the compartment, in spite of the fact that for a same medium or atmosphere the air flow rate in said compartment has a considerable effect on the passengers' physiological feeling or comfort.

It is the object of the arrangement according to this invention to keep at constant values both the air flow rate and the temperature within a passengers' compartment of a vehicle, irrespective of the vehicle speed and the external temperature.

The arrangement acocrding to this invention comprises essentially:

(a) a source of tachometric information driven as a function of the vehicle speed which, through an electromagnet or other adequate device consisting for example of an electric motor so energized that its angular rotation is proportional to the voltage applied thereto, controls on the one hand the opening and closing of the shutter controlling the ingress of external air, and on the other hand a rheostat for regulating the fan speed. Another rheostat manually controlled from within the vehicle permits of displaying or pre-setting the desired air flow rate, which will be preserved irrespective of the vehicle speed, within, of course, the limits of the fan efficiency;

(b) a by-pass inserted in the heater circuit and controlled by means of an electromagnetic valve energized from the alternator of the vehicle.

This regulation is completed by means of a thermostat responsive to the internal temperature of the passengers' compartment.

In order to afford a clearer understanding of this invention and of the manner in which the same may be carried out in practice, reference will now be made to the accompanying drawing illustrating diagrammatically by way of example a typical form of embodiment of the regulator of this invention. In the drawing.

Figure 1:
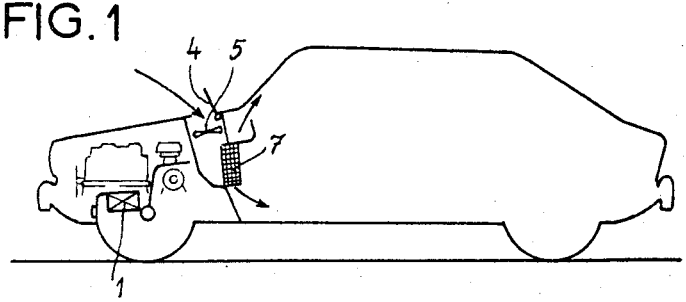
FIGURE 1 illustrates diagrammatically the arrangement of the air-conditioning system within the vehicle.
Figure 2:
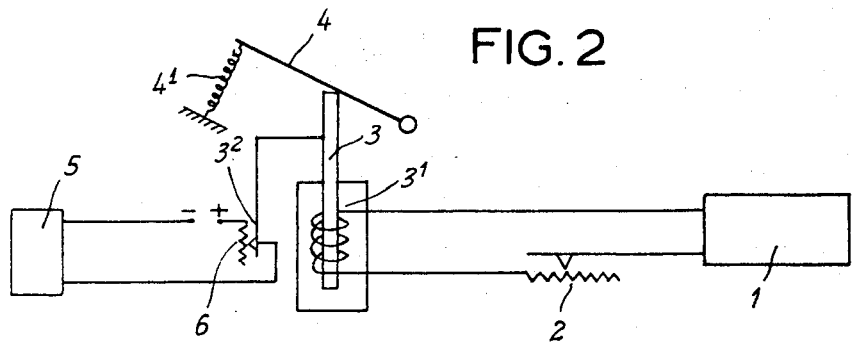
FIGURE 2 is a wiring diagram concerning the air output regulating means.

In the specific form of embodiment illustrating the air output regulating means (FIGURE 2) a tachometric generator 1 delivers a voltage proportional to the road speed of the vehicle. The generator 1, inserted in a circuit comprising an adjustable rheostat 2 adapted to display or pre-set the desired air output and an electromagnet 3 of the sliding core type controlling the opening and closing of an air shutter 4 for regulating the ingress of air into the passengers' compartment as well as the operation of one or more motor fans 5, delivers a current of which the variation in strength causes the sliding core 3 of electromagnet $3^1$ to move, this core 3 being operatively connected to the shutter 4 and to the contact arm $3^2$ of rheostat 6 for controlling the starting and the speed of the motor fan or fans 5.

The air output rate is regulated as follows:

When the vehicle is not in motion, the current and voltage in the circuit are null. The position of core 3 and contact arm $3^2$ is then such that the shutter 4 is in its fully open position and the motor fan or fans 5 revolve at full speed. The air flow rate corresponds to the preset value displayed at 2. At a vehicle speed of, say 40 m.p.h. the voltage controls the closing of shutter 4 to a certain extent and reduces the speed of the motor fan or fans, whereby the air flow rate, with due consideration for the dynamic pressure, remains equal to the output rate obtaining when the vehicle is at a standstill. The higher the vehicle speed, the higher the voltage and the more the shutter 4 is closed, and the velocity of the motor fan or fans decreases in proportion thereto, down to zero value, in order to ensure a constant flow rate. If desired, a return spring $4^1$ may be mounted between the shutter 4 and a fixed portion of the vehicle for closing said shutter 4 when the engine ignition switch is turned off. When the engine ignition switch is turned on, the shutter 4 is raised and opens up to its previous position, as a function of the position of rheostat 2.

Figure 3:
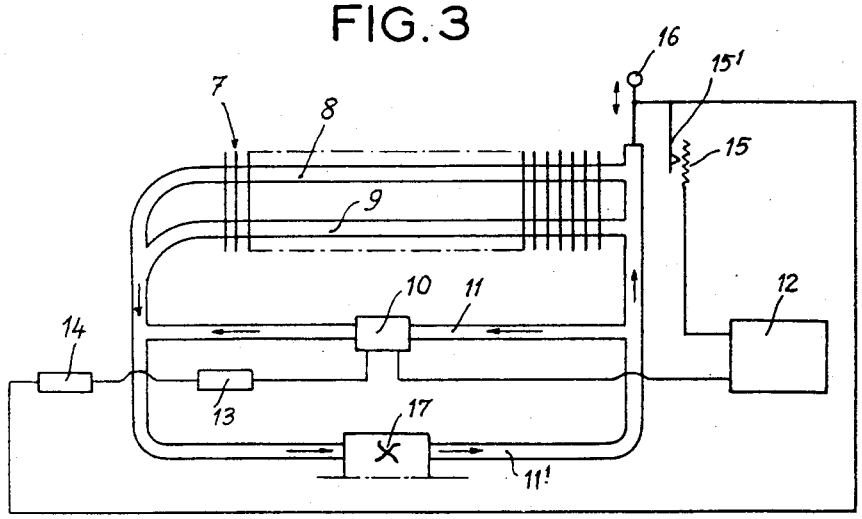
FIGURE 3 is another diagram showing the heater regulator.

For regulating the heating system and according to the specific example illustrated in FIGURE 3 a radiator 7 having two water circuits is used, one circuit 8 concerning more particularly the upper portion, and the other 9 the lower portion, of the passengers' compartment. The driver may nevertheless select the proportions to be applied. In both circuits the regulation takes place upstream of circuits 8 and 9 by means of a by-pass 10 mounted in a secondary circuit 11 connected to these circuits 8 and 9 and also to the circuit $11^1$ of the water pump 17. The by-pass 10 is controlled by an electromagnetic valve monitored by the alternator 12 of the vehicle (this solution being preferred because the water circulation in the heating system is closely connected to the output of the water pump 17 and therefore to the engine speed). A thermistor 13 for the passengers' compartment and another thermistor 14 for the external atmosphere, and a rheostat 15 operatively connected to the presetting and heater collector valve 16 are inserted in the electric circuit controlling the by-pass 10 illustrated in FIGURE 3. This valve 16 is adapted to be actuated manually for adjusting the outputs of the water flowing through the two circuits 8 and 9 respectively; furthermore, it controls the contact arm $15^1$ of rheostat 15. The temperature within the passengers compartment depends:

(i) on the position of valve 16 distributing the water to both circuits 8 and 9;
(ii) on the atmosphere within the compartment;
(iii) on the external atmosphere.

Although the present invention has been described with specific reference to typical applications thereof, it will be readily understood that various modifications and changes can be brought thereto without departing from the spirit and scope of the invention as set forth in the appended claims.

We claim:
1. Device for automatically regulating the air-conditioning system of an automotive vehicle, adapted to maintain constant air output rate and temperature values within the passengers' compartment of the vehicle, irrespective of the road speed of the vehicle and the external temperature, characterized in that it comprises, for regulating the air flow rate, a tachometric generator having inserted in its output circuit a rheostat for presetting the desired value of the air output rate and an electromagnet having a sliding core adapted to control the shutter controlling the ingress of air into the compartment, and the rheostat of an electric circuit controlling the motor fans, and, for regulating the heater, a radiator adapted to be regulated by means of a by-pass inserted in a secondary circuit connected to the water-pump circuit of the vehicle, said by-pass being operatively connected to an electromagnetic valve of which the energization is responsive to the output of the alternator of the vehicle, a manually operated valve controlling in the desired proportions the heating circuit being operatively connected to a rheostat inserted in the electric circuit comprising said alternator, said by-pass electromagnetic valve and thermistors responsive to the room temperature of said passengers' compartment and to the external temperature, respectively.

2. Device according to claim 1, characterized in that said radiator comprises two water circuits corresponding the one to the upper portion and the other the lower portion of the passengers' compartment.

References Cited

UNITED STATES PATENTS

| 2,032,572 | 3/1936 | Hammers et al. | 98—24 |
| 3,028,800 | 4/1962 | Anderson | 98—24 |

EDWARD J. MICHAEL, *Primary Examiner.*